No. 644,089. Patented Feb. 27, 1900.
M. H. McCAULON.
WRENCH.
(Application filed Nov. 14, 1899.)
(No Model.) 2 Sheets—Sheet 1.

Witnesses
Howard D. Orr.
Geo. H. Chandlee.

Inventor
Martin H. McCaulon,
By his Attorneys,
C. A. Snow & Co.

THE NORRIS PETERS CO., PHOTO-LITHO., WASHINGTON, D. C.

No. 644,089. Patented Feb. 27, 1900.
M. H. McCAULON.
WRENCH.
(Application filed Nov. 14, 1899.)
(No Model.) 2 Sheets—Sheet 2.
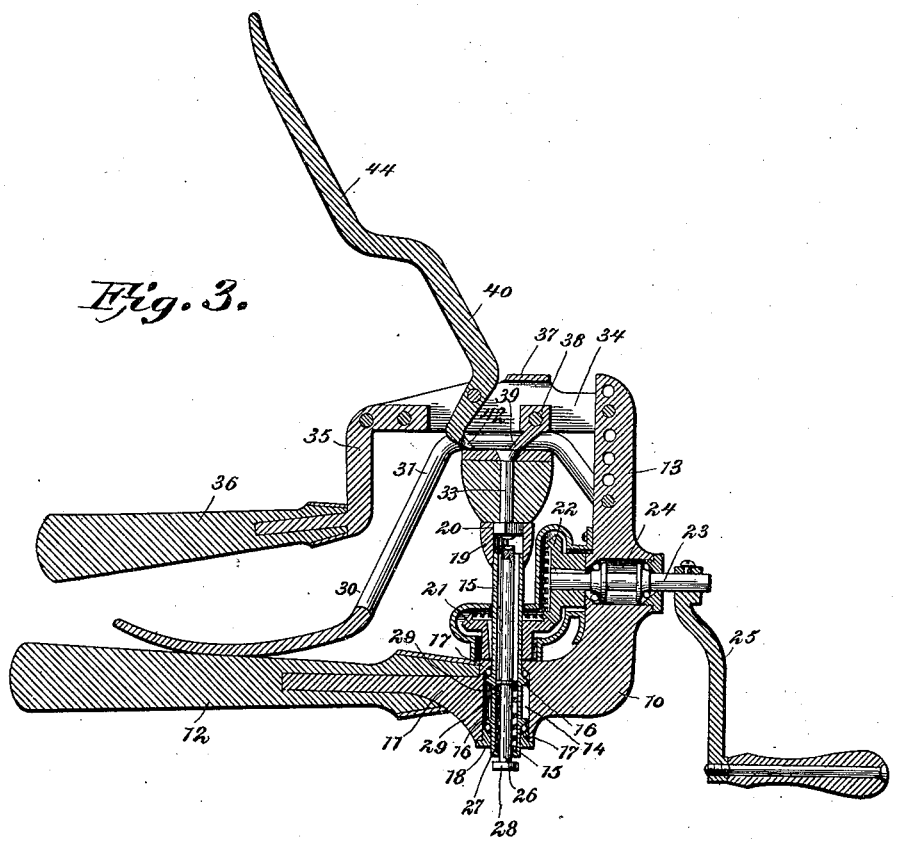
Witnesses
Howard D. Orr.
Geo. H. Chandlee.
Martin H. McCaulon, Inventor,
By his Attorneys,
C. A. Snow & Co.

UNITED STATES PATENT OFFICE.

MARTIN H. McCAULON, OF BUTTERVILLE, INDIANA.

WRENCH.

SPECIFICATION forming part of Letters Patent No. 644,089, dated February 27, 1900.

Application filed November 14, 1899. Serial No. 736,977. (No model.)

*To all whom it may concern:*

Be it known that I, MARTIN H. McCAULON, a citizen of the United States, residing at Butterville, in the county of Jennings and State of Indiana, have invented a new and useful Combination-Tool, of which the following is a specification.

This invention relates to tools for the application and removal of nuts with respect to tire-bolts particularly, although it may be employed for other purposes; and it has for its object to provide in a single implement mechanism which may be adjusted with respect to a wheel and with which a nut may be readily displaced from a tire-bolt, and during which operation the bolt may be held against rotation, also in which, after the nut has been removed, the bolt may be forced upwardly from the wheel and may be then gripped and raised forcibly from its seat, the several parts of the mechanism being adjustable to accommodate wheels and bolts of various dimensions.

A further object of the invention is to form an efficient means for holding the implement in place during its operation, as also for forcing a bolt into its seat and for holding it against rotation during the application of the nut, which is mechanically turned into place.

Figure 1:
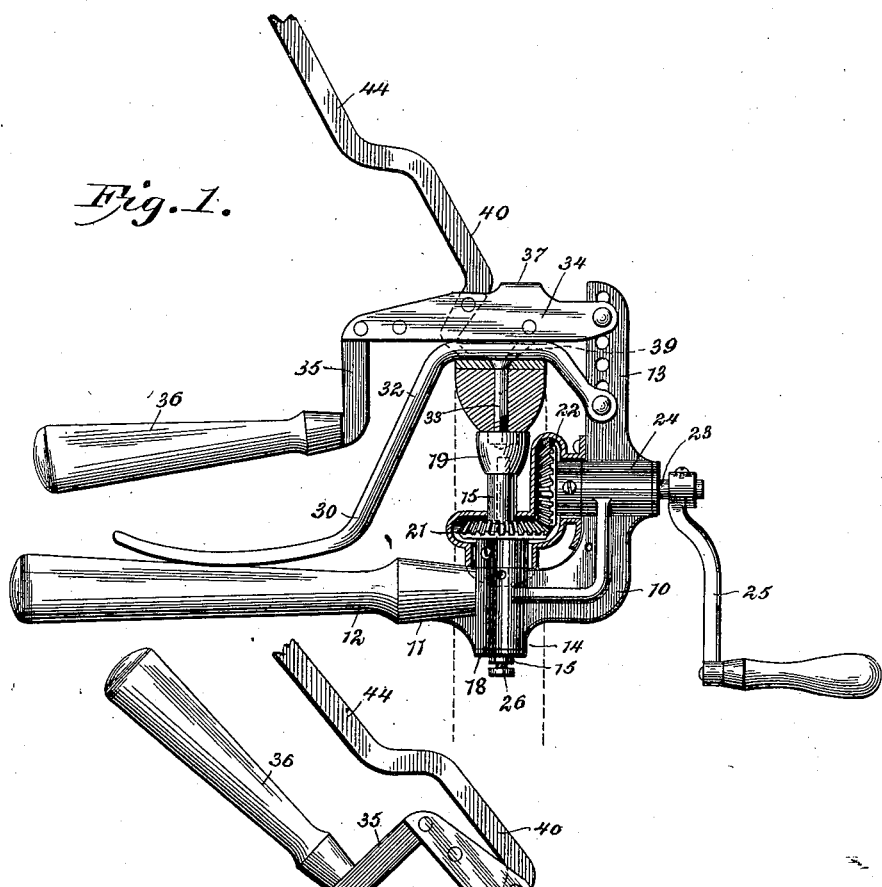
Figure 2:
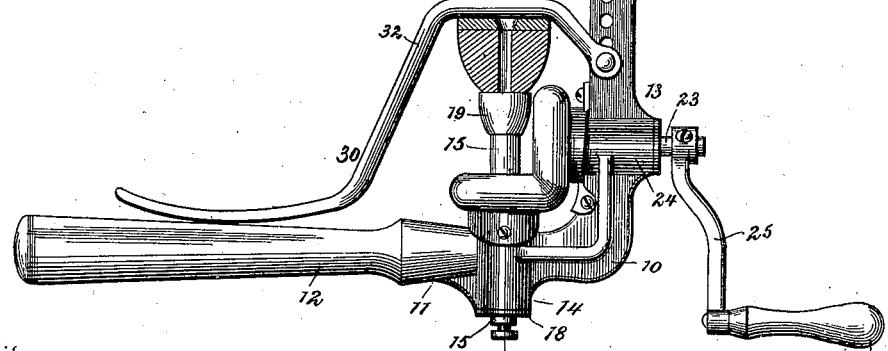

In the drawings forming a portion of this specification and in which like numerals of reference indicate corresponding parts, Figure 1 is a side elevation of the implement, showing its application to the rim of a wheel just previous to the operation of removing a nut and its bolt, the wheel being shown in section. Fig. 2 is a view similar to Fig. 1, showing the positions of the parts after the removal of the nut and with the bolt raised from its seat. Fig. 3 is a vertical central section of the implement with parts thereof in elevation. Fig. 4 is a perspective view of the clamping-lever. Fig. 5 is a detail perspective of the extremity of the bolt-gripping lever. Fig. 6 is a perspective view of the knife-edge for holding the bolt against rotation.

Referring now to the drawings, in operating in accordance with this invention an angular bracket 10 is formed, in one end of which is formed a socket 11 for the reception of a holding-handle 12. That portion of the bracket having the socket 11 lies at right angles to a vertical portion 13 and has therein a vertical opening 14, in which is journaled a hollow shaft 15, carrying cones 16, forming each a race element which operate in conjunction with coöperating races 17, carried by the bracket 10, one of which races 17 is formed at the inner end of a plug 18 in threaded engagement with the lower end of said opening. The shaft 15 passes through the plug 18, which forms a bushing therefor, and at its upper end has an enlargement 19, provided with an opening 20, which is rectangular in cross-section to receive and fit upon the nut to be placed or displaced.

Fixed to the shaft 15 is a beveled gear 21, adapted to mesh with a second beveled gear 22, carried by a shaft 23, having ball-bearings in a transverse perforation 24 in the portion 13 of the bracket. The shaft 23 has a crank 25 for the rotation thereof.

In order to displace a nut from the seat 20, a reciprocatory plunger 26 is mounted in the hollow shaft 15 and is held normally at the upper limit of its movement through the medium of the helical spring 27, one end of which bears upon an inwardly-directed flange 28 upon the lower end of the shaft 15 and the other end of which bears upon a collar 28 upon the plunger. Thus by forcing the plunger 26 upwardly its upper end may be caused to engage a nut in the seat 20 to throw it upwardly therefrom. The normal position of the plunger, however, is such that the nut may lie when free partly within the seat, the nut as it is turned from its bolt passing downwardly and inwardly of the seat and against the action of the plunger.

In practice the implement is disposed with the handle and the lower portion of the bracket passed between the spokes of the wheel to lie interiorly of the rim and with the seat or recess 20 to receive the nut which is to be displaced. In order to hold the implement in this position, a forked lever 30 has the ends of the bifurcations 31 and 32 pivotally connected with the portion 13 of the bracket in order that it may be swung upwardly to admit between it and the enlargement 19 the rim of the wheel to be operated upon, after which said lever 30 is brought downwardly and over the rim of the wheel, said lever from its pivotal connection, when in this position, rising in the direction of the wheel-rim, then extending horizontally to lie upon the outer face of the tire of the wheel, and then extending downwardly to a point adjacent the inner end of the handle 12, after which it is continued outwardly in a position to be grasped, in connection with the handle, to bring the horizontal portion of the lever against the tire of the wheel. By then grasping the lever 30, with the handle 12, they may be brought closely together and the rim of the wheel clamped down upon the enlargement 19, the recess 20 of which will contain the nut to be displaced, and if the crank 25 be then rotated the shaft 15, with its enlargement 19, will be correspondingly moved and will act to displace the nut.

To prevent rotation of the bolt 33 while the nut is being displaced, there is pivoted to the upper portion of the part 13 of the bracket and at opposite sides of the latter the extremities of two plates 34, intermediate the opposite ends of which is fixed an angle-iron 35, carrying a handle 36, through the medium of which the plates 34 may be raised and lowered with respect to the wheel-rim. These plates have a preferable integral connection 37, acting to brace them, and fixed between the plates is a plug 38, downwardly from which extends a knife-edge 39, so positioned as to engage the upper face of the bolt and as the handle 36 is brought downwardly in the direction of the handle 12 sink into the upper surface of the bolt, and thus positively hold it against rotation.

After the nut has been displaced from the bolt it is of course desired to withdraw the bolt, and to effect this operation the plunger 26 is forced by a sharp blow or in any other manner into engagement with the lower end of the bolt, the lever comprising the plates 34, iron 35, and handle 36 having been raised to remove the knife-edge 39 from engagement with the bolt, when the bolt will be projected above the outer surface of the tire. In order to then grasp the bolt beneath its head and raise it from the tire, the lever 40 is pivoted between the plates 34 and has at its lower end outwardly-extending fingers 41 and 42, having an intervening tapered slot 43, which fingers are adapted to pass at opposite sides of the bolt and beneath the head thereof and to receive upon their tapered faces the correspondingly-formed head of the bolt. The lever 40 is angular in shape, so that when in its operative position the outer handle portion 44 thereof will lie adjacent the handle 36, and thus when the bolt is forced partly from its seat, as above described, the handles 44 and 36 may be grasped by the hand of the operator and forced into close relation, resulting in the tight gripping or grabbing of the bolt. By then raising the handles 36 and 44 upon the pivot of the plates 34 the bolt will be drawn from the rim and tire, as illustrated in Fig. 2 of the drawings. It will of course be understood that in this operation the lever 30 may be slightly released, if necessary, to allow torsional movement of the wheel-rim or of the implement with respect to the wheel-rim to enable the upward movement of the bolt at right angles to the face of the tire to prevent bending of the bolt, if it were removed in the arc of a circle.

It will of course be understood that in accordance with the above-described operation after the nut is displaced from the bolt the lower portion of the implement is dropped to permit removal of the nut from the recess 20, although, if desired, the nut may be allowed to remain and receive direct pressure of the plunger 26 in its operation to remove the bolt 33.

In order to adapt the instrument for operation upon wheels having rims of various dimensions and bolts of various lengths, there is formed in the portion 13 of the bracket a vertical series of perforations, which are adapted to removably receive the pivots of the lever 30 and plates 34, whereby the contiguity of the said lever and plates to the cooperating portion of the apparatus may be varied as desired.

In practice it is preferred to inclose the gear of the implement with casings, as shown, and which may be of any desired form and arrangement. Also, as will be readily understood, the ball-bearings illustrated may have any structure and arrangement desired, the proportions of the several parts of the apparatus may be varied, the plates 34 may be formed integral with the iron 35, and other separable portions may likewise be formed integral or varied in shape and material, without departing from the spirit of the invention.

From the foregoing description it will be readily seen that the implement may be employed in the application of a nut as readily as to the removal of a nut, in which event the nut is placed in the nut-recess of the shaft 15, and the parts are then adjusted to the position shown in Fig. 1 of the drawings, after which said shaft may be rotated to turn the nut in a direction to seat upon the bolt that portion of the bolt which projects beyond the nut when the latter is seated, passing downwardly of and into the hollow shaft and against the tendency of the spring-pressed plunger. Where there is an excess in length of the bolt, such excess may be nipped off in the usual manner after the removal of the implement.

Having thus described the invention, what is claimed is—

1. In a device of the class described, the combination with a bracket having a shaft journaled therein, a nut-receiving recess carried by the shaft, a lever adapted to engage a wheel in operative position with respect to the nut-recess, means independent of said lever for engaging a bolt in said wheel, and means for rotating the shaft.

2. In a device of the class described, the combination with a bracket having a shaft journaled therein, and provided with a nut-receiving recess, of a lever adjustably connected with the bracket and adapted to clamp a wheel-rim in operative position with respect to said recess, separate means for engaging a bolt in said wheel, and means for rotating the shaft.

3. The combination with a bracket, of a shaft journaled therein and having a recess, said recess being adapted to receive the nut of a bolt carried by a wheel-rim, means for holding the wheel-rim with its nut in operative relation to the shaft, means for rotating the shaft to remove the nut, and means for initially moving the bolt from the wheel.

4. The combination with a bracket having a shaft journaled therein and provided with a recess, said recess being adapted to receive the nut of a bolt carried by a wheel-rim, means for holding the wheel-rim with its nut in operative relation to the recess, separate means for holding the bolt against rotation, means for initially moving the bolt from the wheel-rim, and means for rotating the shaft.

5. The combination with a bracket having a shaft journaled therein, said shaft having a recess adapted to receive the nut of a bolt carried by a wheel-rim, means for rotating the shaft, means for holding the nut in operative relation to the shaft, means for holding the bolt against rotation, and means for grasping the bolt and raising it from the rim.

6. The combination with a bracket, of a shaft journaled therein, said shaft having a recess adapted to receive the nut of a bolt carried by a body, means for rotating the shaft to move the nut from the bolt, and means for grasping the bolt to move it from the body.

7. The combination with a bracket, of a shaft journaled therein and having a recess adapted to receive the nut of a bolt passed through a body, means for rotating the shaft to remove the nut, means for initially moving the bolt with respect to the body, and means for finally moving the bolt from the body.

8. The combination with a bracket, of a shaft journaled therein and having a recess adapted to receive the nut of a bolt carried by a body, means for rotating the shaft to remove the nut, means for holding the body with the nut in operative relation to the shaft, separate means for holding the bolt against rotation, and additional means for grasping the bolt and removing it from the body.

9. The combination with a bracket, of a shaft journaled therein and having a recess adapted to receive the nut of a bolt carried by a body, means for holding the body with the nut in operative relation to said recess, separate means for holding the bolt against rotation, means for initially moving the bolt with respect to the body, and means for finally withdrawing the bolt from the body.

10. In a device of the class described, the combination with a bracket having a shaft journaled therein, and provided with a nut-receiving recess, of a lever adjustably connected with the bracket and adapted to clamp a body carrying a bolt in operative position with respect to said recess, separate means for engaging said bolt to hold it against rotation, and adjustable with respect to the nut-receiving recess, and means for rotating said shaft.

11. The combination with a bracket, of a shaft journaled therein and having a recess, said recess being adapted to receive the nut of a bolt carried by a body, means for holding the body with its nut in operative relation to said recess, means for rotating the shaft to move the nut, means for initially moving the bolt, and adjustable means for finally removing the bolt from the body.

12. The combination with a bracket having a shaft journaled therein and provided with a recess, said recess being adapted to receive the nut of a bolt carried by a body, of adjustable means for holding the body with its nut in operative relation with the recess, separate adjustable means for holding the bolt against rotation, means for initially moving the bolt, adjustable means for finally removing the bolt, and means for rotating the shaft.

In testimony that I claim the foregoing as my own I have hereto affixed my signature in the presence of two witnesses.

MARTIN H. McCAULON.

Witnesses:
LEWIS M. DENNEY,
FRANK O. WILLEY.